(12) United States Patent
Matsuda (10) Patent No.: US 8,333,259 B2
(45) Date of Patent: Dec. 18, 2012

(54) MOTOR AND ELECTRIC POWER STEERING APPARATUS USING MOTOR

(75) Inventor: Kunihiko Matsuda, Nukata-gun (JP)

(73) Assignee: Denso Corporation, Kariya (JP)

( * ) Notice: Subject to any disclaimer, the term of this patent is extended or adjusted under 35 U.S.C. 154(b) by 6 days.

(21) Appl. No.: 13/136,559

(22) Filed: Aug. 4, 2011

(65) Prior Publication Data

US 2012/0031697 A1 Feb. 9, 2012

(30) Foreign Application Priority Data

Aug. 6, 2010 (JP) .................... 2010-177159

(51) Int. Cl.
*B62D 5/04* (2006.01)
*G01B 7/30* (2006.01)
*H02K 29/08* (2006.01)

(52) U.S. Cl. .. 180/443; 180/444; 310/68 B; 318/400.39; 324/207.25

(58) Field of Classification Search .................. 180/443, 180/444, 446; 310/68 B, 156.32; 318/156.34, 318/118, 400.39; 324/207.25, 252

See application file for complete search history.

(56) References Cited

U.S. PATENT DOCUMENTS

| 6,326,781 | B1 * | 12/2001 | Kunde et al. | 324/207.21 |
| 7,307,415 | B2 * | 12/2007 | Seger et al. | 324/207.2 |
| 8,115,479 | B2 * | 2/2012 | Aimuta et al. | 324/207.25 |
| 2008/0024082 | A1 * | 1/2008 | Atarashi et al. | 318/496 |
| 2009/0206827 | A1 | 8/2009 | Aimuta et al. | |

* cited by examiner

*Primary Examiner* — Kevin Hurley
*Assistant Examiner* — Marc A Scharich
(74) *Attorney, Agent, or Firm* — Harness, Dickey & Pierce, PLC (57) ABSTRACT

A magnetic sensor disposed in an axial direction of a shaft of a motor detects the rotation angle of the rotor by detecting magnetism of the magnet that is disposed on one end of the shaft. A first and second conducting wires extend in parallel with an axis of the shaft, and are equidistantly positioned relative to the axis, on a virtual circle that has a center point on the axis of the shaft. The electric current flowing in the first conducting wire and the electric current flowing in the second conducting wire have the same magnitude and the same flow direction with each other at any time. When the first conducting wire and the second conducting wire are on opposite sides relative to the center point of the virtual circle, the magnetic fields around the conducting wires cancel with each other, thereby enabling accurate detection of the rotation angle.

12 Claims, 5 Drawing Sheets

MOTOR AND ELECTRIC POWER STEERING APPARATUS USING MOTOR

CROSS REFERENCE TO RELATED APPLICATION

The present application is based on and claims the benefit of priority of Japanese Patent Application No. 2010-177159, filed on Aug. 6, 2010, the disclosure of which is incorporated herein by reference.

FIELD OF THE INVENTION

The present disclosure generally relates to a motor having a magnet rotating with a rotor, and an electric power steering that uses the motor.

BACKGROUND INFORMATION

Conventionally, a brushless motor or the like that controls electric power supply to a winding wire according to a rotation angle of a rotor has a position sensor for detecting the rotation angle, which is disclosed in WO2008/062778 (WO '2778). The position sensor is known to detect a rotation angle in the brushless motor by having a magnet disposed on a rotating part that rotates together with the rotor, and by detecting a magnetic field generated by the magnet with a magnetic sensor such as a Hall element or a magneto-resistive element. In such motor, a conducting wire that connects (a) a control unit controlling electricity to supply the electric power to a winding wire and (b) a winding wire of the motor has an electric current flowing therein, a magnetic field is formed around the connecting wire. Therefore, the magnetic sensor detecting the magnetic field of the magnet will be affected by the magnetic field formed around the conducting wire. If the motor has a configuration that arranges the conducting wire closed to the magnetic sensor, the detection result of the magnetic sensor is caused to have an error, thereby deteriorating a detection accuracy. When the detection accuracy is deteriorated, a torque ripple of the motor may be increased, or loss of output power may be caused. More specifically, if the motor is used to generate a steering assist torque in an electric power steering apparatus in a vehicle, an increase of the torque ripple of the motor leads to an increase the steering assist torque, and, as a result, a smooth steering assist torque is not provided for the driver of the vehicle.

SUMMARY OF THE INVENTION

In view of the above and other problems, the present disclosure provides a motor that has an improved detection accuracy of its rotation angle by suppressing an influence of the magnetic field generated by an electric current flowing in the conducting wire.

In an aspect of the present disclosure, the motor includes: a stator, a rotor, a shaft, a magnet, a magnetic sensor, and a control unit, as well as a first conducting wire and a second conducting wire. The stator has a plurality of winding wires, wound thereon. The rotor is disposed in a radial inside of the stator, in a rotatable manner. The shaft is disposed on the same axis as the rotor, and rotates with the rotor. The magnet is disposed on one end of the shaft, and rotates with the rotor and the shaft. The magnetic sensor is disposed in an axial direction of the shaft to face the magnet, and detects the rotation angle of the rotor by sensing the magnetism generated by the magnet. The control unit controls the electric power supplied to the winding wire based on the rotation angle of the rotor detected by the magnetic sensor. The first conducting wire and the second conducting wire intersect with a virtual circle that centers around the axis of the shaft, and both of the first and second conducting wires extend in parallel with the above axis, to connect to the control unit to each of the plural winding wires. The electric current supplied to the winding wire flows in the first conducting wire and the second conducting wire.

In the present disclosure, the electric current flowing in each of the first conducting wire and the second conducting wire has the same magnitude and the opposite flow direction with each other at any point of time. Further, when (a) an intersection of the first conducting wire with the virtual circle is designated as a point p1, and an intersection of the second conducting wire with the virtual circle is designated as a point p2, and (b) a central angle of an arc between the point p1 and the point p2 on the virtual circle is designated as $\alpha$ degree, the position of the first conducting wire and the position of the second conducting wire satisfy a relationship $\alpha=180$. In other words, the first conducting wire and the second conducting wire are at opposite positions with the axis of the shaft interposed there-between.

In another aspect of the present disclosure, the position of the first conducting wire and the position of the second conducting wire satisfy a relationship $\alpha=0$. In other words, the first conducting wire and the second conducting wire are put in contact with each other.

In yet another aspect of the present disclosure, the motor also includes: a third conducting wire. The first conducting wire intersects with a tangent line of a virtual circle that centers around the axis of the shaft, and extends in parallel with the above axis, to connect the control unit and the winding wire. The electric current supplied to the winding wire flows in the first conducting wire. The second conducting wire intersects with a tangent point on the tangent line of the virtual circle that centers around the axis of the shaft, and extends in parallel with the above axis, to connect the control unit and the winding wire. The electric current supplied to the winding wire flows in the second conducting wire. The third conducting wire intersects with the tangent line of the virtual circle that centers around the axis of the shaft, at an opposite position relative to an intersecting point of the first conducting wire and the tangent line against the tangent point (i.e., an intersecting point of the second conducting wire and the virtual circle), and extends in parallel with the above axis, to connect the control unit and the winding wire. The electric current supplied to the winding wire flows in the third conducting wire.

In the present disclosure, the sum of the electric currents in the first to third conducting wires is zero at any point of time. The motor such as a three-phase brushless motor is known to have such configuration. Further, when (a) an intersection of the first conducting wire with the virtual circle is designated as the point p1, and an intersection of the second conducting wire with the virtual circle is designated as the point p2, and an intersection of the third conducting wire with the virtual circle is designated as the point p3, and (b) a distance between the point p1 and the point p2 is designated as d1, and a distance between the point p2 and the point p3 is designated as d2, the positions of the first to third conducting wires satisfy a relationship $d1=d2=0$. In other words, the first to third conducting wires are put in contact with each other.

Further, a power steering using the motor with the above-described configuration is disclosed. The motor of the present disclosure uses the magnetic sensor that is unaffected by the electric-current-induced magnetic field formed by the conducting wire which connects the winding wire to the control unit. Therefore, the detection accuracy of the rotation angle of the rotor is high. As a result, the increase of the torque ripple of the motor or the decrease of output from the motor is prevented. Therefore, the driver can get a smooth steering assist torque from the electric power steering apparatus of the present disclosure.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Embodiments of the present disclosure are explained in the following with reference to the drawing. In those embodiments, like parts have like numbers, and explanation of like parts are omitted from the subsequent embodiments.

(First Embodiment)

Figure 1:
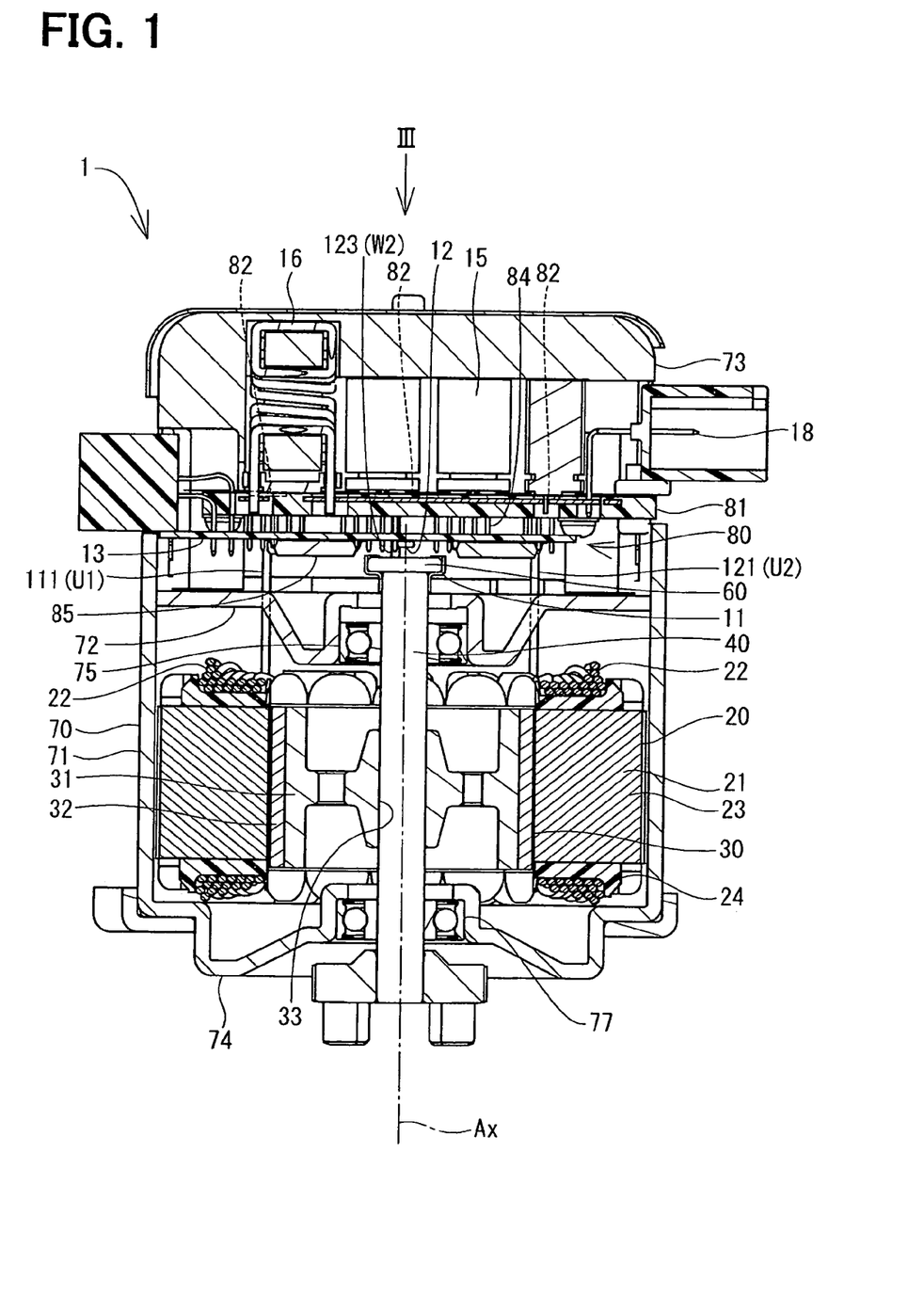
FIG. 1 is a cross sectional view of a motor of the present disclosure.
Figure 2:
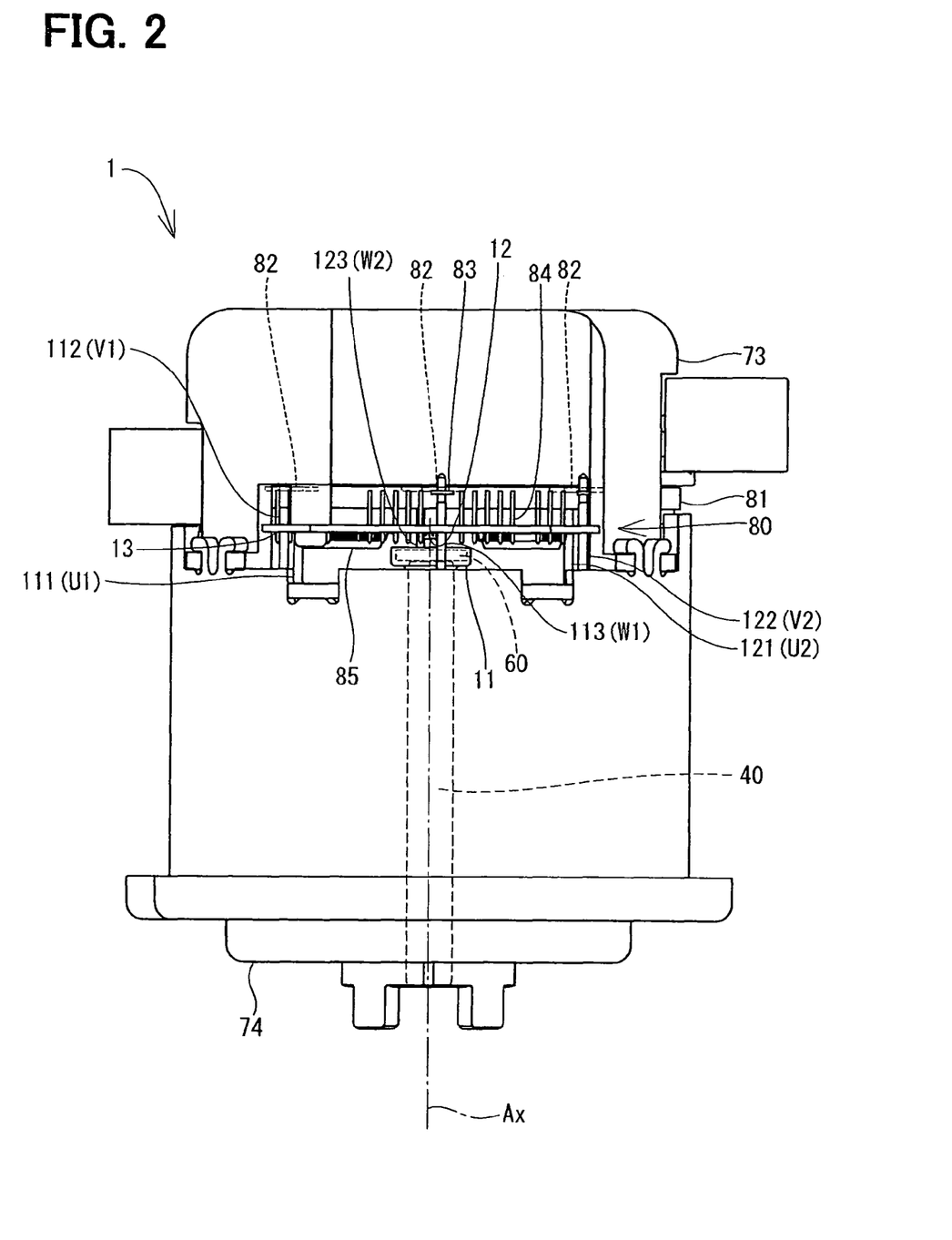
FIG. 2 is a side view of the motor of FIG. 1 of the present disclosure.

With reference to FIGS. 1 and 2, a motor 1 is used in an electric power steering apparatus in a vehicle, which is not illustrated, and where the motor 1 provides power assistance steering to a driver of the vehicle.

The motor 1, with a central axis Ax, includes a stator 20, a rotor 30, a shaft 40, a magnet 60, a magnetic sensor 12, and a control unit 80. The stator 20 includes a plurality of salient poles 21. In the present embodiment, six salient poles 21 are arranged circularly at equal intervals to make the stator 20. The salient pole 21 includes laminated core 23 of layered thin magnetic material and an insulator 24 engaged with the laminated core 23 from a radial direction. Each of the insulators 24 includes a winding wire 22 wound thereon. When the electric power is supplied to the winding wire 22, the salient pole 21 produces magnetic force.

The rotor 30 is formed with magnetism materials, such as an iron in the shape of a pipe. The rotor 30 includes a rotor core 31 and a permanent magnet 32. The permanent magnet 32 is disposed on the outer surface (i.e the radial outside surface) of the rotor core and a N pole and a S pole of the permanent magnet 32 are disposed alternatively in a circumferential direction of the rotor core 31.

The rotor core 31 defines an axis hole 33 around the axis Ax. The shaft 40, which may be made of metal, is formed in the shape of a rod, and is press-fitted in the axis hole 33 such that the center axis of the shaft 40 is the axis Ax. In other words, the shaft 40 is coaxially disposed with the rotor 30, and is rotatable with the rotor 30.

A motor case 70 is formed with metal, such as aluminum, and includes a pipe part 71, a partition 72 and a frame end 74. The pipe part 71 may be formed in a cylindrical shape, and defines a hole that houses the stator 20. In the assembled condition of the motor 1, the pipe part 71 is centered on the axis Ax. The partition 72 is formed inward toward the axis Ax of the pipe part 71 in a manner that blocks one end of the pipe part 71. The frame end 74 is formed inward toward the axis Ax of the pipe part 71 in a manner that blocks the other end of the pipe part 71.

In the assembled condition of the motor 1, the rotor 30 is positioned in the center of the stator 20 (i.e disposed within an inner radius of the stator 20) such that the rotor 30 is surrounded by the salient poles 21 and is rotatable within the center of the stator 20. The stator 20 and the rotor 30 are positioned in the pipe part 71 of the motor case 70. The partition 72 may define a bearing hole that is centered on the axis Ax, and where a bearing 75 is disposed. Similarly, the frame end 74 may define a bearing hole that is centered on the axis Ax, and where a bearing 77 is disposed. The rotor 30 is positioned between the bearing 75 and the bearing 77, such that the shaft 40 and the rotor 30 are rotatably supported by the motor case 70 via the bearings 75 and 77.

The magnet 60, which is located near the partition 72 portion of the motor case 70, is coupled on the shaft 40 by a holder 110. Thus, the magnet 60 may rotate together with the holder 11, the shaft 40, and the rotor 30.

The control unit 80 includes an electric power converter 81 and a microcomputer 85. The electric power converter 81 includes a plurality of switching elements 82, where each switching element is coupled to a terminal 83 and control terminal 84. The electric power converter 81 is formed in the shape of a board, by resin-molding the switching elements 82, the terminal 83 and the control terminal 84. In an assembled condition, the electric power converter 81 is positioned a predetermined distance from the magnet 60 in an axial direction of the shaft 40. Where the electric power converter 81 is positioned perpendicularly to the axis Ax (i.e. the thickness direction or the vertical direction of the power converter 81 is same as the direction of the axis Ax of the shaft 40).

Each of the switching elements 82 is coupled to a power terminal 18. The power terminal 18 is coupled to a battery, which is not illustrated. In addition, the terminal 83 in each of the switching elements 82 are coupled with each of the winding wires 22 through conducting wires 111, 112, 113, 121, 122 and 123, as shown in FIG. 2.

The switching element 82 is a semiconductor element, such as MOSFET, IGBT or the like, and switches the electric power supplied to the winding wire 22. During a switch operation of the switching elements 82, the electric power is supplied from the battery to the winding wire 22. The electric current flows through the power terminal 18 into each of the switching elements 82 then to the conducting wires 111, 112, 113, 121, 122 and 123, and then the winding wires 22. During this time, the switching elements 82 dissipate heat. The switching element 82 includes a heat dissipation surface to dissipate the heat.

A heat sink 73 is positioned next to the electric power converter 81, such that, in an assembled condition, the stator 20 is one side of the electric power converter 81 and the heat sink 73 is positioned on the other side of the electric power converter 81. The heat sink 73 is formed with metal, such as aluminum. A surface of the heat sink 73 is in abutment (or is positioned directly next to) the heat dissipation surface of the switching element 82. By such configuration, heat from the switching elements 82 is dissipated to the heat sink 73.

A plurality of capacitors 15 and choke coils 16 are disposed in a space formed between the electric power converter 81 and the heat sink 73. Each of the capacitors 15 is coupled to each of the switching elements 82. The capacitor 15 absorbs a surge voltage at the time of the switching operation of the switching element 82. The choke coil 16 has a core in a toroidal shape, and reduces noise in the power supply.

A substrate 13 is disposed between the electric power converter 81 and the magnet 60 such that the horizontal axis of the substrate 13 is perpendicular to the axis Ax (i.e an orientation of substrate 13 thickness or vertical axis is aligned with the central axis Ax). The magnetic sensor 12 is disposed between the substrate 13 and the magnet 60 such that the magnetic sensor 12 faces the magnet 60 and is positioned on the axis Ax. In other words, the magnetic sensor 12 is disposed on the axis Ax of the shaft 40. The magnetic sensor 12 has magnetism detecting elements, such as a magneto-resistive element (i.e., an MR element) or a hall element, for example. By those magnetism detecting elements, the magnetic sensor 12 can detect magnetism of the magnet 60, thereby detecting the rotation angle of the rotor 30. In the present embodiment, the conducting wires 111, 112, 113, 121, 122 and 123 are arranged on a circumferential side of the magnetic sensor 12 (i.e., a substrate surface direction of the magnetic sensor 12), as shown in FIG. 2. In other words, a virtual plane including the substrate surface 13 of the magnetic sensor 12 intersects with the conducting wires 111, 112, 113, 121, 122 and 123.

The microcomputer 85 is disposed on a side of the substrate 13 such that the microcomputer is located between the substrate and the partition 72. The microcomputer 85 is coupled to the control terminal 84 of the electric power converter 81 and to the magnetic sensor 12. The microcomputer 85 controls switching of the electric power by the switching elements 82 of the electric power converter 81, based on the rotation angle of the rotor 30 detected by the magnetic sensor 12 and based on other factors.

The conducting wire 111 is coupled to the winding wire 22 that corresponds to a first U phase. The conducting wire 112 is coupled to the winding wire 22 that corresponds to a first V phase. The conducting wire 113 is coupled to the winding wire 22 that corresponds to a first W phase. The conducting wire 121 is coupled to the winding wire 22 that corresponds to a second U phase. The conducting wire 122 is coupled to the winding wire 22 that corresponds to a second V phase. The conducting wire 123 is coupled to the winding wire 22 that corresponds to a second W phase.

When the electric power supplied through the conducting wires 111, 112, 113, 121, 122 and 123 to the plural winding wires 22 are switched by the microcomputer 85 sequentially, the stator 20 generates a rotating magnetic field. The rotor 30 rotates due to this rotating magnetic field. The rotating power of the rotor 30 is output from an opposite end of the shaft 40 opposite to the magnet 60, and utilized as a driving force in the electric power steering apparatus (i.e., a power to assist the steering of the vehicle driver).

According to the configuration stated above, the motor 1, which is a brushless motor, is driven by a three phase driving method having two systems. That is, the conducting wire 111 (U phase), the conducting wire 112 (V phase) and the conducting wire 113 (W phase) together with the switching elements 82 and the winding wires 22 connected thereto forms one system (i.e., the first system), and the conducting wire 121 (U phase), the conducting wire 122 (V phase) and the conducting wire 123 (W phase) together with the switching elements 82 and the winding wires 22 connected thereto forms the other system (i.e., the second system).

Each of the conducting wires is hereinafter designated as the U phase conducting wire 111, the V phase conducting wire 112, and the W phase conducting wire 113, so as to clarify correspondences between the conducting wire 111 and the winding wire 22 in the U phase, between the conducting wire 112 and the winding wire 22 in the V phase, and between the conducting wire 113 and the winding wire in the W phase. Similarly, the conducting wire 121, the conducting wire 122 and the conducting wire 123 are respectively designated as the U phase conducting wire 121, the V phase conducting wire 122, and the W phase conducting wire 123.

In the present embodiment, each of the U phase conducting wire 111, the V phase conducting wire 112 and the W phase conducting wire 113 in the first system corresponds to "the first conducting wire" in claims. Similarly, the U phase conducting wire 121, the V phase conducting wire 122 and the W phase conducting wire 123 in the second system corresponds to "the second conducting wire" in claims. In addition, each of a pair of the U phase conducting wire 111 and the U phase conducting wire 121, a pair of the V phase conducting wire 112 and the V phase conducting wire 122, and a pair of the W phase conducting wire 113 and the W phase conducting wire 123 corresponds to "a pair of the first conducting wire and the second conducting wire" in claims.

Figure 3A:
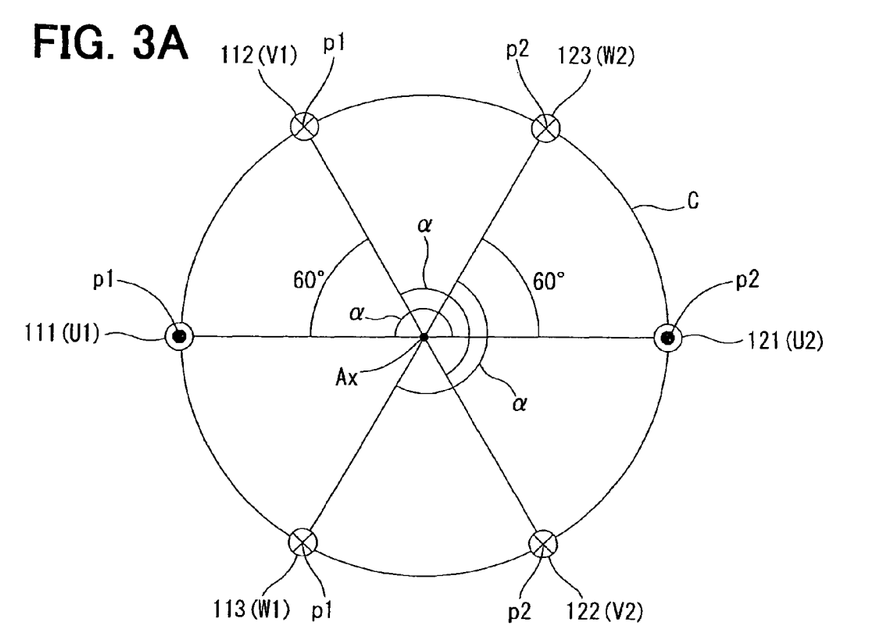
FIGS. 3A and 3B are illustrations of an arrangement of conducting wires in the motor of FIG. 1 and a partial view of the arrangement according to the first embodiment.

In the following, the arrangement of the U/V/W phase conducting wires 111, 112, 113 and the U/V/W phase conducting wires 121, 122, 123 in the present embodiment is explained with reference to FIGS. 1 to 3B. FIG. 3A is an illustration of the conducting wire arrangement viewed from direction "III" of the motor 1 in FIG. 1, together with the electric current flow direction in each of the conducting wires at a certain point of time.

As shown in FIGS. 1 to 3A, the U phase conducting wire 111 (U1), the V phase conducting wire 112 (V1), the W phase conducting wire 113 (W1), the U phase conducting wire 121 (U2), the V phase conducting wire 122 (V2) and the W phase conducting wire 123 (W2) intersect with the virtual circle C, where the center of the virtual circle C is the axis Ax of the shaft 40, and extends in parallel with the axis Ax, to connect the control unit 80 and the winding wire 22.

An intersection between the virtual circle C and the U phase conducting wire 111 is designated as a point p1, and an intersection between the virtual circle C and the U phase conducting wire 121 is designated as a point p2, thereby defining an arc p1p2 on the virtual circle C. The arc p1p2 has a central angle $\alpha$, where the U phase conducting wire 111 and the U phase conducting wire 121 are arranged to satisfy a relationship $\alpha=180$, as shown in FIG. 3A. In other words, when viewed in the axis Ax direction, the U phase conducting wire 111 and the U phase conducting wire 121 are arranged to face with each other at opposite positions relative to the axis Ax. Similar to a pair of the U phase conducting wire 111 and the U phase conducting wire 121, a pair of the V phase conducting wire 112 and the V phase conducting wire 122, and a pair of the W phase conducting wire 113 and the W phase conducting wire 123, are respectively positioned to have the central angle $\alpha=180$ for an arc defined by intersecting points between those conducting wires and the virtual circle C. The distance between two conducting wires in the circumferential direction of the virtual circle C is set to have a value of 60 degrees, that is, set to an equal interval.

The electric current flowing in each of the conducting wires is configured to obey the following rules. The illustration in FIG. 3A shows that the electric current in the U phase conducting wire 111 and the U phase conducting wire 121 flows from the back of the illustration toward the viewer of the illustration, in the axis Ax direction of the shaft 40. The illustration also shows that the electric current in the V phase conducting wire 112 and the V phase conducting wire 122, and in the W phase conducting wire 113 and the W phase conducting wire 123 flows from the viewer of the illustration toward the back of the illustration, in the axis Ax direction of the shaft 40. In other words, in the present embodiment, the flow direction of the electric current in the U phase conducting wire 111 and the flow direction of the electric current in the U phase conducting wire 121 are the same at an arbitrary point of time. Likewise, the flow direction of the electric current in the V phase conducting wire 112 and the flow direction of the electric current in the V phase conducting wire 122 are also the same at an arbitrary point of time. Furthermore, the flow direction of the electric current in the W phase conducting wire 113 and the flow direction of the electric current in the W phase conducting wire 123 are the same at an arbitrary point of time.

Further, in the present embodiment, the magnitude of the electric current in the U phase conducting wire 111 and the magnitude of the electric current in the U phase conducting wire 121 are the same at an arbitrary point of time. Likewise, the magnitude of the electric current in the V phase conducting wire 112 and the magnitude of the electric current in the V phase conducting wire 122 are also the same at an arbitrary point of time. Furthermore, the magnitude of the electric current in the W phase conducting wire 113 and the magnitude of the electric current in the W phase conducting wire 123 is the same at an arbitrary point of time.

In summary, the electric current flowing in the first conducting wire (i.e., the U phase conducting wire 111, the V phase conducting wire 112, the W phase conducting wire 113) and the electric current flowing in the second conducting wire (i.e., the U phase conducting wire 121, the V phase conducting wire 122, the W phase conducting wire 123) has the same magnitude and flow direction at any time, in the present embodiment.

Figure 3B:
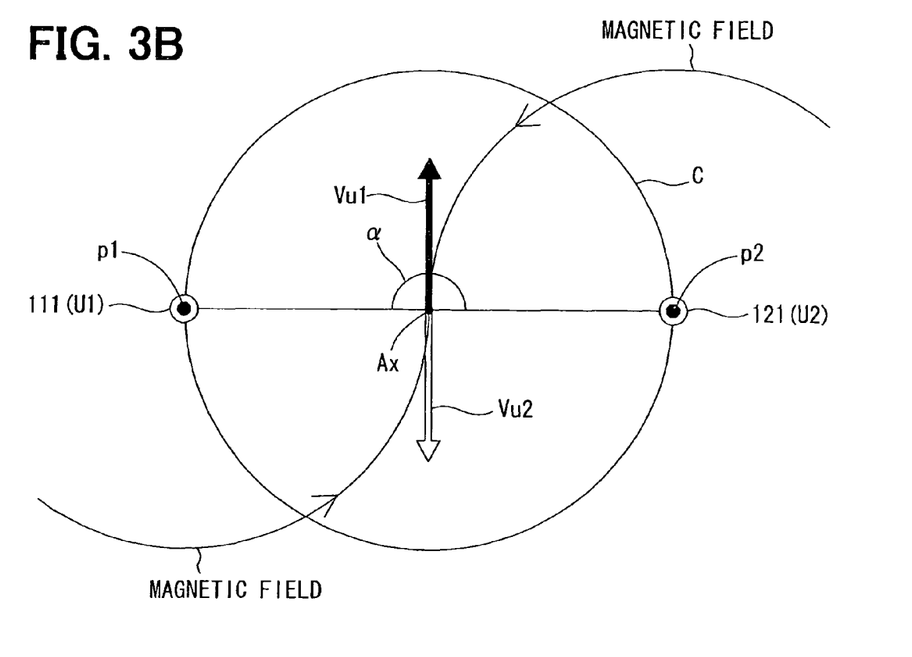

The magnetic field formed around the conducting wire is explained with reference to FIG. 3B. The illustration in FIG. 3B shows an interaction of the magnetic fields formed by the U phase conducting wire 111 and the U phase conducting wire 121, which are extracted from FIG. 3A. When the electric current in the U phase conducting wire 111 flows from the back of the illustration toward the viewer of the illustration, the electric-current-induced magnetic field of the counterclockwise direction is formed around the U phase conducting wire 111. Further, the electric current flowing from the back of the illustration toward the viewer of the illustration in the U phase conducting wire 121 forms the electric-current-induced magnetic field of the counterclockwise direction around the U phase conducting wire 121. Therefore, at the proximity of the center of the virtual circle C (i.e., at and around the axis Ax of the shaft 40), a direction of a vector Vu1 of the electric-current-induced magnetic field formed by the U phase conducting wire 111 and a direction of a vector Vu2 of the electric-current-induced magnetic field formed by the U phase conducting wire 121 are opposite to each other. In such case, due to the same magnitude of the electric current flowing in both of the U phase conducting wire 111 and the U phase conducting wire 121 at any time, the magnitude of the vector Vu1 and the magnitude of the vector Vu2 are the same. Therefore, on the axis Ax of the shaft 40, the electric-current-induced magnetic field formed by the U phase conducting wire 111 and the electric-current-induced magnetic field formed by the U phase conducting wire 121 cancel with each other. Likewise, on the axis Ax of the shaft 40, the electric-current-induced magnetic field formed by the V phase conducting wire 112 and the electric-current-induced magnetic field formed by the V phase conducting wire 122 bring mutual-cancellation into effect, mutual-cancellation being brought into effect between two electric-current-induced magnetic fields respectively formed by the W phase conducting wire 113 and by the W phase conducting wire 123.

In the present embodiment, due to the above configuration, the magnetic sensor 12 disposed on the axis Ax of the shaft 40 detects magnetism generated by the magnet 60, without being affected by the electric-current-induced magnetic fields respectively formed by the U phase conducting wire 111, the U phase conducting wire 121, the V phase conducting wire 112, the V phase conducting wire 122, the W phase conducting wire 113 and the W phase conducting wire 123.

As described above, the electric current flowing in the first conducting wire (i.e., the U phase conducting wire 111, the V phase conducting wire 112, the W phase conducting wire 113) and the electric current flowing in the second conducting wire (i.e., the U phase conducting wire 121, the V phase conducting wire 122, the W phase conducting wire 123) have the same magnitude and the same flow direction at any time in the present embodiment. In addition, the first conducting wire and the second conducting wire are arranged to satisfy a relationship of $\alpha=180$, when an intersection p1 of the first conducting wire with the virtual circle C and an intersection p2 of the second conducting wire with the virtual circle C defines an arc p1p2 having the central angle $\alpha$. In other words, the first conducting wire and the second conducting wire are disposed on opposite sides of the axis Ax of the shaft 40, facing with each other.

When an electric current flows in the first conducting wire and the second conducting wire, an electric-current-induced magnetic field is formed around each of the first conducting wire and the second conducting wire. If the flow direction of the electric current in each of the two conducting wires is the same, the directions of the vectors of the electric-current-induced magnetic fields formed by the first conducting wire and the second conducting wire are opposite to each other at a position that has the same distance from the first conducting wire and the second conducting wire. In the present embodiment, the electric current spreading in each of the first conducting wire and the second conducting wire has the same magnitude and the same direction at an arbitrary point of time. In addition, the first conducting wire and the second conducting wire are disposed at the opposite position relative to the axis Ax of the shaft 40. Therefore, the electric-current-induced magnetic field formed by the first conducting wire and the electric-current-induced magnetic field formed by the second conducting wire cancel with each other on the axis Ax of the shaft 40, which is equidistant from the first and second conducting wires. Therefore, the magnetism generated by the magnet 60 is not affected by the electric-current-induced magnetic field formed around each of the first conducting wire and the second conducting wire, when the magnetic sensor 12 disposed on the axis Ax of the shaft 40 detects the magnetism of the magnet 60. Therefore, the rotation angle of the rotor 30 is accurately detected.

In the present embodiment, three pairs of the first and second conducting wires are disposed in one motor (a pair of the U phase conducting wire 111 and the U phase conducting wire 121, a pair of the V phase conducting wire 112 and the V phase conducting wire 122, and a pair of the W phase conducting wire 113 and the W phase conducting wire 123). In other words, the motor 1 is a motor of three phase drive method having two systems. That is, even when multiple pairs of the first and second conducting wires are disposed in one motor, the electric-current-induced magnetic fields are configured to cancel with each other in each of the multiple pairs of the first conducting wire and the second conducting wire, thereby, enabling accurate detection of the rotation angle of the rotor 30.

In addition, the motor 1 of the present embodiment is used for the electric power steering apparatus. In the motor 1 of the present embodiment, the magnetic sensor 12 is not affected by the electric-current-induced magnetic field formed by the conducting wires (i.e., the U phase conducting wire 111, the U phase conducting wire 121, the V phase conducting wire 112, the V phase conducting wire 122, the W phase conducting wire 113 and the W phase conducting wire 123) which connect the winding wire 22 to the control unit 80. Therefore, the detection accuracy of the rotation angle of the rotor 30 is greatly improved or is higher. As a result, the increase of the torque rippled of the motor 1 or the decrease of the output is prevented. Thus, the vehicle driver has a smooth steering assist torque.

(Second Embodiment)

Figure 4A:
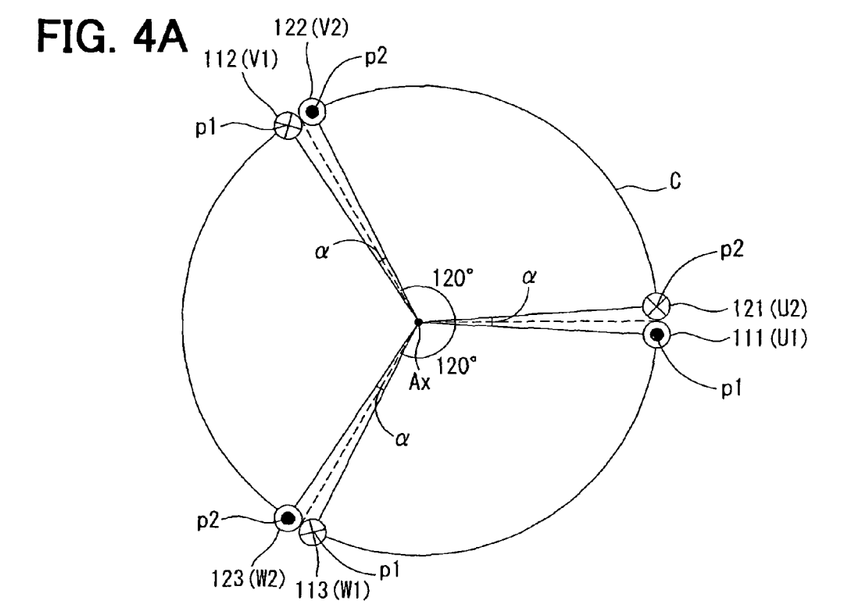
FIGS. 4A and 4B are illustrations of an arrangement of conducting wires in the motor and a partial view of the arrangement according to a second embodiment.
Figure 4B:
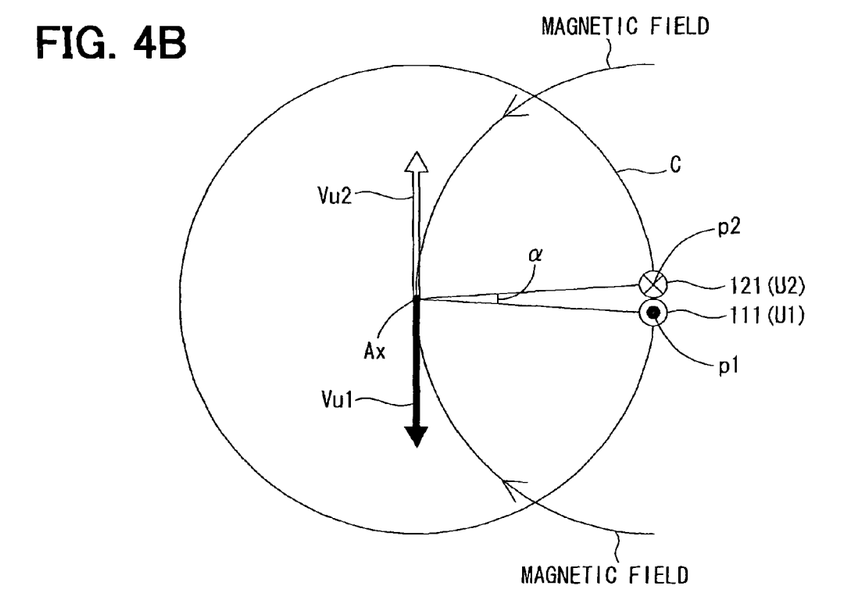

The arrangement of the conducting wires-of the motor in the second embodiment of the present disclosure is illustrated in FIG. 4. Though the schematic configuration of the second embodiment is the same as the first embodiment, difference of the arrangement of the conducting wires connecting the winding wire 22 to the control unit 80 relative to the first embodiment is a focus of the explanation in the following description.

In the present embodiment, similarly to the first embodiment, each of the U phase conducting wire 111, the V phase conducting wire 112 and the W phase conducting wire 113 in the first system corresponds to "the first conducting wire" in claims. Each of the U phase conducting wire 121, the V phase conducting wire 122 and the W phase conducting wire 123 in the second system corresponds to "the second conducting wire" in claims. Further, each of a pair of the U phase conducting wire 111 and the U phase conducting wire 121, a pair of the V phase conducting wire 112 and the V phase conducting wire 122 and a pair of the W phase conducting wire 113 and the W phase conducting wire 123 corresponds to "a pair of the first conducting wire and the second conducting wire" in claims.

With reference now to 4A and 4B of the second embodiment, the arrangement of the U phase conducting wire 111, the V phase conducting wire 112, the W phase conducting wire 113, the U phase conducting wire 121, the V phase conducting wire 122 and the W phase conducting wire 123 is explained. FIG. 4A illustrates the arrangement of the conducting wires when the motor is viewed from direction "III", together with the flow direction of the electric current at a certain point of time in each of the conducting wires.

The U phase conducting wire 111 (U1), the V phase conducting wire 112 (V1), the W phase conducting wire 113 (W1), the U phase conducting wire 121 (U2), the V phase conducting wire 122 (V2) and the W phase conducting wire 123 (W2) are disposed to respectively intersect with the virtual circle C, which has its center on the axis Ax of the shaft 40, and respectively extend in parallel with the axis Ax, to connect the control unit 80 to the winding wires 22.

As shown in FIG. 4A, an intersection of the virtual circle C and the U phase conducting wire 111 is designated as a point p1 and an intersection of the virtual circle C and the U phase conducting wire 121 is designated as a point p2 that defines an arc p1p2 on the virtual circle C. The arc p1p2 has a central angle α, where the U phase conducting wire 111 and the U phase conducting wire 121 are arranged to satisfy a relationship of α=0. In other words, the U phase conducting wire 111 and the U phase conducting wire 121 are put in contact with each other. Due to the exaggeration of the thickness of each of the conducting wires in FIG. 4A, the value of the angle α may not look like 0. However, when the thickness of the conducting wires are sufficiently thin, the angle α can be assumed to be equal to 0.

Similarly, for each of a pair of the V phase conducting wire 112 and the V phase conducting wire 122 and a pair of the W phase conducting wire 113 and the W phase conducting wire 123, the central angle of the arc defined by two intersection points of the conducting wires on the virtual circle C is configured to be equal to 0 degree, just like a pair of the U phase conducting wire 111 and the U phase conducting wire 121. In addition, the interval between each pair of the conducting wires is set to 120 degrees in the circumferential direction of the virtual circle C in the present embodiment.

The electric current flowing in each of the conducting wires is explained in the following. In FIG. 4A, the illustration shows that the electric current in each of the U phase conducting wire 111, the V phase conducting wire 122 and that the W phase conducting wire 123 flows from the back of the illustration toward the viewer of the illustration (in the axis Ax direction of the shaft 40). The illustration also shows that the electric current in each of the U phase conducting wire 121, the V phase conducting wire 112 and the W phase conducting wire 113 flows from the viewer side of the illustration toward the back of the illustration (in the axis Ax direction of the shaft 40). In other words, the flow direction of the electric current in each of the U phase conducting wire 111 and the U phase conducting wire 121 is opposite to each other at an arbitrary point of time. Likewise, the flow direction of the electric current in each of the V phase conducting wire 112 and in the V phase conducting wire 122 is opposite to each other at an arbitrary point of time. Further, the flow direction of the electric current in each of the W phase conducting wire 113 and the W phase conducting wire 123 is opposite to each other at an arbitrary point of time.

In addition, the magnitude of the electric current in the U phase conducting wire 111 and the U phase conducting wire 121 is the same at an arbitrary point of time. Likewise, the magnitude of the electric current in the V phase conducting wire 112 and the V phase conducting wire 122 is the same at an arbitrary point of time. Further, the magnitude of the electric current in the W phase conducting wire 113 and the W phase conducting wire 123 is the same at an arbitrary point of time.

In summary, the electric current flowing in the first conducting wire (i.e., the U phase conducting wire 111, the V phase conducting wire 112, the W phase conducting wire 113) and the electric current flowing in the second conducting wire (i.e., the U phase conducting wire 121, the V phase conducting wire 122, the W phase conducting wire 123) have the same magnitude at an arbitrary point of time, but opposite flow direction with each other.

The magnetic field formed around the conducting wires is explained with reference to FIG. 4B in the following. The illustration in FIG. 4B shows an interaction of the magnetic field respectively formed around the U phase conducting wire 111 and the U phase conducting wire 121, which are extracted from FIG. 4A.

As shown in FIG. 4B, the electric-current-induced magnetic field of the counterclockwise direction is formed around the U phase conducting wire 111 when the electric current in the U phase conducting wire 111 flows from the back of the illustration toward the viewer of the illustration. Further, the electric-current-induced magnetic field of the clockwise direction is formed around the U phase conducting wire 121 when the electric current in the U phase conducting wire 121 flows from the viewer side of the illustration toward the back of the illustration. Therefore, at the proximity of the center of the virtual circle C (i.e., at and around the axis Ax of the shaft 40), a direction of a vector Vu1 of the electric-current-induced magnetic field formed by the U phase conducting wire 111 and a direction of a vector Vu2 of the electric-current-induced magnetic field formed by the U phase conducting wire 121 are opposite to each other. In such case, due to the same magnitude of the electric current flowing in both of the U phase conducting wire 111 and the U phase conducting wire 121 at any time, the magnitude of the vector Vu1 and the magnitude of the vector Vu2 are the same. Therefore, on the axis Ax of the shaft 40, the electric-current-induced magnetic field formed by the U phase conducting wire 111 and the electric-current-induced magnetic field formed by the U phase conducting wire 121 cancel with each other. Likewise, on the axis Ax of the shaft 40, the electric-current-induced magnetic field formed by the V phase conducting wire 112 and the electric-current-induced magnetic field formed by the V phase conducting wire 122 bring mutual-cancellation into effect. As well as mutual-cancellation being brought into effect between two electric-current-induced magnetic fields respectively formed by the W phase conducting wire 113 and by the W phase conducting wire 123.

In the present embodiment, due to the above configuration, the magnetic sensor 12 disposed on the axis Ax of the shaft 40 detects magnetism generated by the magnet 60, without being affected by the electric-current-induced magnetic fields respectively formed by the U phase conducting wire 111, the U phase conducting wire 121, the V phase conducting wire 112, the V phase conducting wire 122, the W phase conducting wire 113 and the W phase conducting wire 123.

As described above, the electric current flowing in the first conducting wire (i.e., the U phase conducting wire 111, the V phase conducting wire 112, the W phase conducting wire 113) and the electric current flowing in the second conducting wire (i.e., the U phase conducting wire 121, the V phase conducting wire 122, the W phase conducting wire 123) have the same magnitude, and opposite flow directions at any time in the present embodiment. In addition, the first conducting wire and the second conducting wire are arranged to satisfy a relationship of $\alpha=0$, when an intersection p1 of the first conducting wire with the virtual circle C and an intersection p2 of the second conducting wire with the virtual circle C defines an arc p1p2 having the central angle $\alpha$. In other words, the first conducting wire and the second conducting wire are put in contact with each other.

When an electric current flows in the first conducting wire and the second conducting wire, an electric-current-induced magnetic field is formed around each of the first conducting wire and the second conducting wire. When the first and second conducting wires are sufficiently close to each other, the flow direction of the electric current in each of the two conducting wires is opposite to each other. Also, the directions of the vectors of the electric-current-induced magnetic fields respectively formed by the first conducting wire and the second conducting wire are opposite to each other at a position that has the same distance from the first conducting wire and the second conducting wire. The electric current flowing in each of the first conducting wire and the second conducting wire has the same magnitude and opposite directions at an arbitrary point of time. In addition, the first conducting wire and the second conducting wire are disposed in contact with each other. Therefore, the electric-current-induced magnetic field formed by the first conducting wire and the electric-current-induced magnetic field formed by the second conducting wire cancel with each other on the axis Ax of the shaft 40, which is positioned equidistant from both of the first and second conducting wires. Therefore, the magnetism generated by the magnet 60 is not affected by the electric-current-induced magnetic field formed by each of the first conducting wire and the second conducting wire, when the magnetic sensor 12 disposed on the axis Ax of the shaft 40 detects the magnetism of the magnet 60. Therefore, the rotation angle of the rotor 30 is accurately detected.

(Third Embodiment)

Figure 5A:
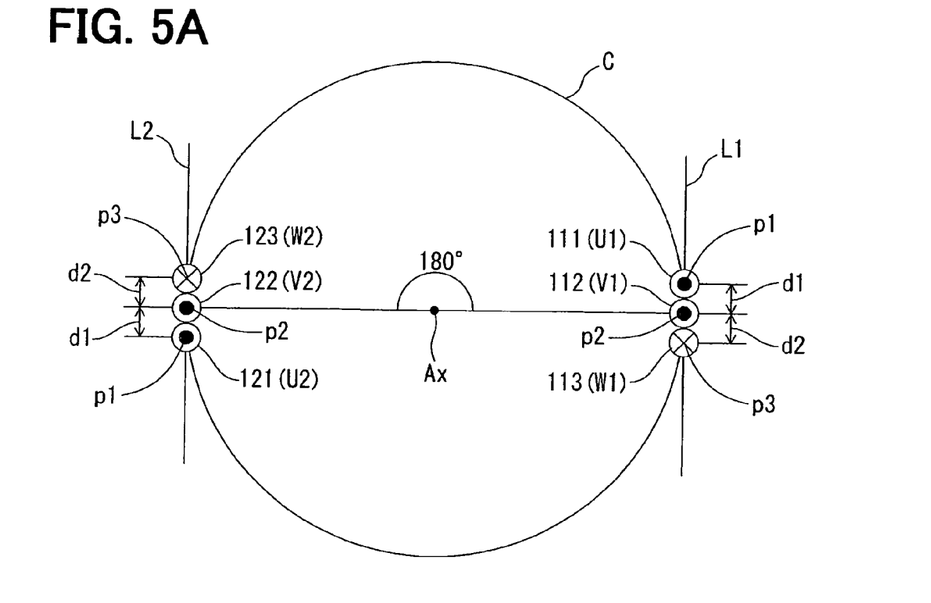
FIGS. 5A and 5B are illustrations of an arrangement of conducting wires in the motor and a partial view of the arrangement according to a third embodiment.
Figure 5B:
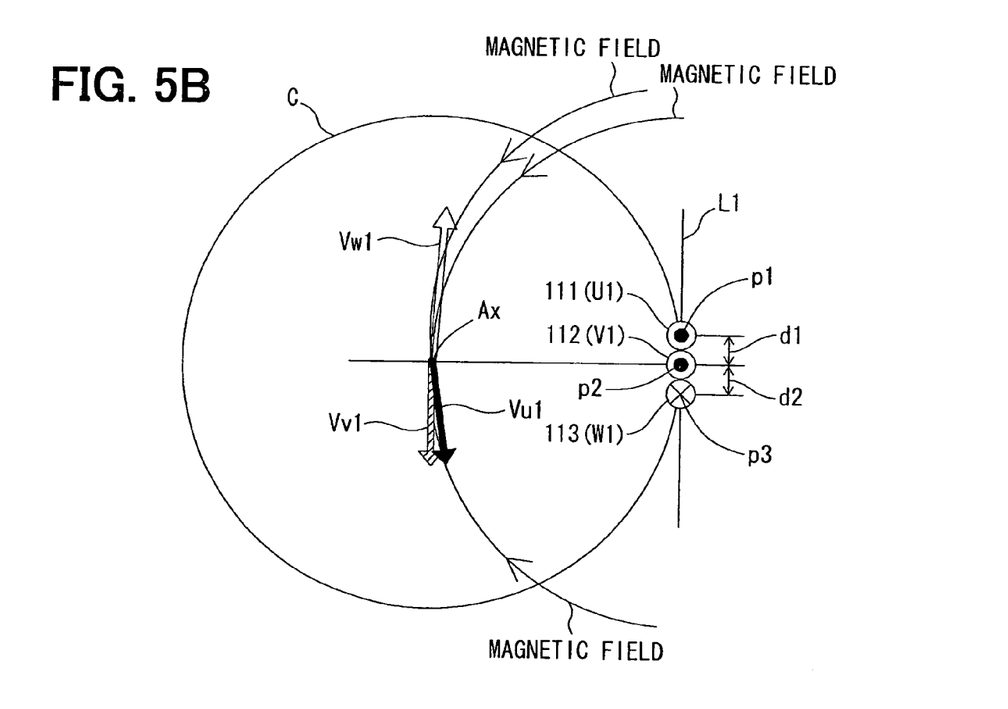

The arrangement of the conducting wires of the motor in the third embodiment of the present disclosure is illustrated in FIG. 5. Though the schematic configuration of the third embodiment is the same as the first embodiment, difference of the arrangement of the conducting wires connecting the winding wire 22 to the control unit 80 relative to the first embodiment is a focus of the explanation in the following description.

In the present embodiment, each of the U phase conducting wire 111 the U phase conducting wire 121 corresponds to "the first conducting wire" in claims, and each of the V phase conducting wire 112 and the V phase conducting wire 122 corresponds to "the second conducting wire" in claims, and each of the W phase conducting wire 113 and the W phase conducting wire 123 corresponds to "the third conducting wire" in claims, which is different from the first embodiment. Further, each of a group of the U phase, conducting wire 111, the V phase conducting wire 112, and the W phase conducting wire 113 in the first system, and a group of the U phase conducting wire 121, the V phase conducting wire 122, and the W phase conducting wire 123 in the second system corresponds to "the group of the first, second and third conducting wires" in claims.

With reference now to FIGS. 5A and 5B, the arrangement of the U phase conducting wire 111, the V phase conducting wire 112, the W phase conducting wire 113, the U phase conducting wire 121, the V phase conducting wire 122 and the W phase conducting wire 123 is explained. FIG. 5A illustrates the arrangement of the conducting wires when the motor in the present embodiment is viewed from the "III" direction (i.e axis Ax direction of the shaft 40), together with the flow direction of the electric current at a certain point of time in each of the conducting wires.

The U phase conducting wire 111 (U1), the V phase conducting wire 112 (V1), the W phase conducting wire 113 (W1), the U phase conducting wire 121 (U2), the V phase conducting wire 122 (V2) and the W phase conducting wire 123 (W2) are disposed to respectively intersect with the virtual circle C, which has its center on the axis Ax of the shaft 40, and respectively extend in parallel with the axis Ax, to connect the control unit 80 to the winding wires 22.

As shown in FIG. 5A, the U phase conducting wire 111 is configured to intersect with a tangent line L1 of the virtual circle C. The U phase conducting wire 121 is configured to intersect with a tangent point on the tangent line L2 of the virtual circle C. The W phase conducting wire 113 is configured to intersect with the tangent line L1 of the virtual circle C on an opposite side of an intersection between the U phase conducting wire 111 and the tangent line L1 relative to the tangent point.

When an intersection of the tangent line L1 and the U phase conducting wire 111 is designated as a point p1, an intersection of the tangent line L1 and the V phase conducting wire 112 as a point p2, and an intersection of the tangent line L1 and the W phase conducting wire 113 as a point p3. A distance d1 defined as an interval between the point p1 and the point p2, and a distance d2 defined as an interval between the point p2 and the point p3, the three conducting wires are configured to satisfy a relationship of d1=d2=0. In other words, the U phase conducting wire 111, the V phase conducting wire 112, and the W phase conducting wire 113 are put in contact with each other. Due to the exaggeration of the thickness of each of the conducting wires in FIG. 5A, the value of the distances d1 and d2 may not look like 0. However, when the thickness of the conducting wires are sufficiently thin, the distances d1 and d2 can be assumed to be equal to 0.

A group of the U phase conducting wire 121, the V phase conducting wire 122, and the W phase conducting wire 123 are arranged on a tangent line L2 of the virtual circle C. Similar to the group of the U phase conducting wire 111, the V phase conducting wire 112, and the W phase conducting wire 113, a distance d1 between the U phase conducting wire 121 and the V phase conducting wire 122 and a distance d2 between the V phase conducting wire 122 and the W phase conducting wire 123 are respectively equal to 0. Further, the V phase conducting wire 112 and the V phase conducting wire 122 are arranged to face with each other at opposite positions relative to the axis Ax of the shaft 40.

The electric current flowing in each of the conducting wires is configured to obey the following rules. The illustration in FIG. 5A shows that the electric current in each of the U phase conducting wire 111 and the V phase conducting wire 112, and also in each of the U phase conducting wire 121 and the V phase conducting wire 122, flows from the back of the illustration toward the viewer of the illustration in the axis Ax direction of the shaft 40. The illustration in FIG. 5A further shows that the electric current in each of the W phase conducting wire 113 and the W phase conducting wire 123 flows from the viewer side of the illustration toward the back of the illustration, in the axis Ax direction of the shaft 40. The motor in the present embodiment is a three-phase brushless motor. Therefore, the sum of the electric currents flowing in each of the U phase conducting wire 111, the V phase conducting wire 112 and the W phase conducting wire 113 is equal to 0 at any point of time. Further, the sum of the electric current in each of the U phase conducting wire 121, the V phase conducting wire 122 and the W phase conducting wire 123 is equal to 0 at any point of time.

In summary, the sum of the electric currents flowing in each of the first conducting wire (i.e., the U phase conducting wire 111, the U phase conducting wire 121), the second conducting wire (i.e., the V phase conducting wire 112, the V phase conducting wire 122) and the third conducting wire (i.e., the W phase conducting wire 113, the W phase conducting wire 123) is equal to 0 at any point of time in the present embodiment.

The magnetic field formed around the conducting wires is explained with reference to FIG. 5B in the following. The illustration in FIG. 5B shows the arrangement of the U phase conducting wire 111, the V phase conducting wire 112 and the W phase conducting wire 113 extracted from FIG. 5A.

The electric-current-induced magnetic field of the counter-clockwise direction is formed, as shown in FIG. 5B, around the U phase conducting wire 111 and the V phase conducting wire 112, when the electric current in the U phase conducting wire 111 and the V phase conducting wire 112 flows from the back of the illustration toward the viewer of the illustration. On the other hand, the electric-current-induced magnetic field of the clockwise direction is formed around the W phase conducting wire 113, when the electric current in the W phase conducting wire 113 flows from the viewer side of the illustration toward the back of the illustration. Therefore, at the proximity of the center of the virtual circle C (i.e., at and around the axis Ax of the shaft 40), the sum of three vectors, a vector Vu1 of the electric-current-induced magnetic field formed around the U phase conducting wire 111, a vector Vv1 of the electric-current-induced magnetic field formed around the V phase conducting wire 112, and a vector Vw1 of the electric-current-induced magnetic field formed around the W phase conducting wire 113, is equal to 0. Therefore, on the axis Ax of the shaft 40, the electric-current-induced magnetic fields respectively formed around the U phase conducting wire 111, the V phase conducting wire 112 and the W phase conducting wire 113 cancel with each other. Likewise, on the axis Ax of the shaft 40, the electric-current-induced magnetic fields respectively formed around the U phase conducting wire 121, the V phase conducting wire 122 and the W phase conducting wire 123 cancel with each other.

In the present embodiment, due to the above configuration, the magnetic sensor 12 disposed on the axis Ax of the shaft 40 detects magnetism generated by the magnet 60, without being affected by the electric-current-induced magnetic fields respectively formed by the U phase conducting wire 111, the U phase conducting wire 121, the V phase conducting wire 112, the V phase conducting wire 122, the W phase conducting wire 113 and the W phase conducting wire 123.

The sum of electric currents flowing in each of the first conducting wire (the U phase conducting wire 111, the U phase conducting wire 121), the second conducting wire (the V phase conducting wire 112, the V phase conducting wire 122) and the third conducting wire (the W phase conducting wire 113, the W phase conducting wire 123) is equal to 0 at any point of time as explained in the above. In addition, when each of the intersections of tangent lines (i.e., L1, L2) of the virtual circle C that centers on the axis Ax of the shaft 40 with the first to third conducting wires are designated as the points p1, p2, p3, together with definition of the p1-p2 distance d1 and the p2-p3 distance d2, the first/second/third conducting wires are arranged to satisfy a relationship of d1=d2=0. In other words, the first conducting wire and the second conducting wire and the third the conducting wire are put in contact with each other.

When the electric current flows in the first conducting wire, the second conducting wire and the third the conducting wire, the electric-current-induced magnetic field is formed around each of the first conducting wire, the second conducting wire and the third the conducting wire. When the following two conditions are satisfied, that is, (a) the sum of the electric currents in the first, second, and third conducting wires is equal to 0, (b) a distance between the first, second and third conducting wires is sufficiently close to 0, the sum of the three vectors of the electric-current-induced magnetic fields respectively formed around the first conducting wire, the second conducting wire and the third the conducting wire at a position that is equidistant from all of the three conducting wires is equal to 0. The sum of the electric current flowing in each of the first conducting wire, the second conducting wire and the third-the conducting wire is equal to 0 at any point of time. In addition, the first to third conducting wires are put in contact with each other. Therefore, on the axis Ax of the shaft 40 that is arranged in equidistance from all of the first to third conducting wires, the electric-current-induced magnetic fields respectively formed around the first, second and third conducting wires cancel with each other. Therefore, the magnetism generated by the magnet 60 is not affected by the electric-current-induced magnetic field formed around each of the first to third conducting wires, when the magnetic sensor 12 disposed on the axis Ax of the shaft 40 detects the magnetism of the magnet 60. Therefore, the rotation angle of the rotor 30 is accurately detected.

In the present embodiment, two groups of the first to third conducting wires are provided (i.e., a group of the U phase conducting wire 111, the V phase conducting wire 112 and the W phase conducting wire 113, and a group of the U phase conducting wire 121, the V phase conducting wire 122 and the W phase conducting wire 123). In other words, the motor in the present embodiment is a motor of three phase drive method having two systems, and the motor in the present embodiment is similar to the one in the first embodiment and the second embodiment, in terms of configuration of the drive method. In other words, even when multiple groups of the first to third conducting wires are used in configuration, the electric-current-induced magnetic fields in each group cancel with each other, thereby enabling the accurate detection of the rotation angle of the rotor 30.

(Other Embodiments)

In the above-mentioned first embodiment, the first conducting wire and the second conducting wire are configured to satisfy a relationship of $\alpha=180$. However, in other embodiments of the present disclosure, the first conducting wire and the second conducting wire may not be configured to precisely satisfy a relationship of $\alpha=180$. That is, mutual-cancellation of the electric-current-induced magnetic fields respectively formed around the first and second conducting wires are brought into effect, when $\alpha$ is substantially equal to 180. In other words, the central angle $\alpha$ may preferably have a value that sets the detection accuracy of the magnetic sensor within an acceptable error range.

In the above-mentioned second embodiment, the first conducting wire and the second conducting wire are configured to satisfy a relationship of $\alpha=0$. However, in other embodiments of the present disclosure, the first conducting wire and the second conducting wire may not be configured to precisely satisfy a relationship of $\alpha=0$. That is, mutual-cancellation of the electric-current-induced magnetic fields respectively formed around the first and second conducting wires are brought into effect, when $\alpha$ is substantially equal to 0. In other words, the central angle $\alpha$ may preferably have a value that sets the rotation angle detection accuracy of the magnetic sensor within an acceptable error range.

In the above-mentioned third embodiment, the first conducting wire, the second conducting wire and the third the conducting wire are configured to satisfy a relationship of $d1=d2=0$. However, in other embodiments of the present disclosure, the first conducting wire, the second conducting wire and the third conducting wire may not be configured to precisely satisfy a relationship of $d1=d2=0$. That is, mutual-cancellation of the electric-current-induced magnetic fields respectively formed around the first to third conducting wires are brought into effect, when $d1$ and $d2$ are substantially equal to 0. In other words, the distances $d1$ and $d2$ may preferably have a value that sets the rotation angle detection accuracy of the magnetic sensor within an acceptable error range. Therefore, the configuration in which the first conducting wire, the second conducting wire and the third conducting wire are not in contact with each other may be possible.

In the above-mentioned embodiments, an interval between two or more "pairs of the first conducting wire and the second conducting wire" is configured to be equal, and an interval between two or more "groups of the first to third conducting wires" is configured to be equal. However, in other embodiments of the present disclosure, it may be possible that an interval between two or more "pairs of the first conducting wire and the second conducting wire" is not configured to be equal, and that an interval between two or more "groups of the first to third conducting wires" is not configured to be equal.

In the above-mentioned embodiments, "a pair of the first conducting wire and the second conducting wire" and "a group of the first to third conducting wires" are respectively provided in multiple sets. However, in other embodiments of the present disclosure, "a pair of the first conducting wire and the second conducting wire" and "a group of the first to third conducting wires" may be provided only in one set. For example, a single-phase drive-method motor or a three-phase drive-method motor may also be included in the present disclosure.

In the above-mentioned embodiments, the first conducting wire and the second conducting wire (and the third conducting wire) are arranged on the circumferential side of the magnetic sensor (i.e., the substrate surface direction of the magnetic sensor). However, the first conducting wire and the second conducting wire (and the third conducting wire) may not necessarily be arranged on the circumferential side of the magnetic sensor, if the magnetic sensor is arranged on the axis of the shaft. In such configuration, the virtual plane including the substrate surface of the magnetic sensor does not intersect with the first conducting wire and the second conducting wire (and the third conducting wire). Even in such configuration, the mutual-cancellation effect of the electric-current-induced magnetic fields formed around the first and second conducting wires (and the third conducting wire) is provided.

The present disclosure may be applicable to a motor with the brush as well as a brushless motor.

In addition, the motor of the present disclosure may be used for various kinds of devices or instrumentation as well as the electric power steering apparatus.

The present disclosure described above may thus be modifiable to have various forms as long as pertaining to the spirit of the disclosure.

What is claimed is:

1. A motor comprising:
a stator that includes a plurality of winding wires wound thereon;
a rotor rotatably disposed within an inner radius of the stator;
a shaft coaxially disposed to be rotatable with the rotor;
a magnet disposed on one end of the shaft to be rotatable with the rotor and the shaft;
a magnetic sensor disposed in an axial direction of the shaft for detecting a rotation angle of the rotor by sensing the magnetism generated by the magnet;
a control unit for controlling an electric power supplied to each of the plurality of the winding wires based on the rotation angle of the rotor detected by the magnetic sensor; and
a first conducting wire and a second conducting wire (a) respectively intersecting with a virtual circle that centers around an axis of the shaft and (b) respectively extending in parallel with the axis of the shaft, for connecting the control unit to each of the plurality of winding wires, wherein
the electric current flowing in each of the first conducting wire and the second conducting wire has a same magnitude and a same flow direction with each other at any point of time, and
a position of the first conducting wire and a position of the second conducting wire satisfy a relationship $\alpha=180$, when (a) an intersection of the first conducting wire with the virtual circle is designated as a point p1, and an intersection of the second conducting wire with the virtual circle is designated as a point p2, and (b) a central angle of an arc between the point p1 and the point p2 on the virtual circle is designated as $\alpha$ degree.

2. The motor of claim 1, wherein
a pair of the first and second conducting wires is made in plural sets.

3. A motor comprising:
a stator that includes a plurality of winding wires wound thereon;

a rotor rotatably disposed within an inner radius of the stator;

a shaft coaxially disposed to be rotatable with the rotor;

a magnet disposed on one end of the shaft to be rotatable with the rotor and the shaft;

a magnetic sensor disposed in an axial direction of the shaft for detecting a rotation angle of the rotor by sensing the magnetism generated by the magnet;

a control unit for controlling an electric power supplied to each of the plurality of winding wire based on the rotation angle of the rotor detected by the magnetic sensor; and a first conducting wire and a second conducting wire (a) respectively intersecting with a virtual circle that centers around an axis of the shaft and (b) respectively extending in parallel with the axis of the shaft, for connecting the control unit to each of the plurality of winding wires, wherein the electric current flowing in each of the first conducting wire and the second conducting wire has a same magnitude and opposite flow directions with each other at any point of time, and a position of the first conducting wire and a position of the second conducting wire satisfy a relationship $\alpha=0$, when (a) an intersection of the first conducting wire with the virtual circle is designated as a point p1, and an intersection of the second conducting wire with the virtual circle is designated as a point p2, and (b) a central angle of an arc between the point p1 and the point p2 on the virtual circle is designated as $\alpha$ degree.

4. The motor of claim 3, wherein a pair of the first and second conducting wires is made in plural sets.

5. A motor comprising:

a stator that includes a plurality of winding wires wound thereon;

a rotor rotatably disposed within an inner radius of the stator;

a shaft coaxially disposed to be rotatable with the rotor;

a magnet disposed on one end of the shaft to be rotatable with the rotor and the shaft;

a magnetic sensor disposed in an axial direction of the shaft for detecting a rotation angle of the rotor by sensing the magnetism generated by the magnet;

a control unit for controlling an electric power supplied to each of the plurality of winding wire based on the rotation angle of the rotor detected by the magnetic sensor; and a first conducting wire, a second conducting wire and a third conducting wire (a) respectively intersecting with a tangent line of a virtual circle that centers around an axis of the shaft and (b) respectively extending in parallel with the axis of the shaft, for connecting the control unit to each of the plurality of winding wires, the second conducting wire being positioned at a tangent point of the tangent line to interpose between the first and third conducting wires, wherein a sum of the electric currents respectively flowing in the first, second and third conducting wires is equal to zero at any point of time, and positions of the first, second and third conducting wires satisfy a relationship of $d1=d2=0$, when (a) an intersection of the first conducting wire with the virtual circle is designated as a point p1, and an intersection of the second conducting wire with the virtual circle is designated as a point p2, and an intersection of the third conducting wire with the virtual circle is designated as a point p3, and (b) a distance d1 is defined as an interval between the point p1 and the point p2, and a distance d2 is defined as an interval between the point p2 and the point p3.

6. The motor of claim 5, wherein a group of the first to third conducting wires is made in plural sets.

7. An electric power steering apparatus comprising:

a motor, which includes:

a stator that includes a plurality of winding wires wound thereon;

a rotor rotatably disposed within an inner radius of the stator;

a shaft coaxially disposed to be rotatable with the rotor;

a magnet disposed on one end of the shaft to be rotatable with the rotor and the shaft;

a magnetic sensor disposed in an axial direction of the shaft for detecting a rotation angle of the rotor by sensing the magnetism generated by the magnet;

a control unit for controlling an electric power supplied to each of the plurality of the winding wires based on the rotation angle of the rotor detected by the magnetic sensor; and a first conducting wire and a second conducting wire (a) respectively intersecting with a virtual circle that centers around an axis of the shaft and (b) respectively extending in parallel with the axis of the shaft, for connecting the control unit to each of the plurality of winding wires, wherein the electric current flowing in each of the first conducting wire and the second conducting wire has a same magnitude and a same flow direction with each other at any point of time, and a position of the first conducting wire and a position of the second conducting wire satisfy a relationship $\alpha=180$, when (a) an intersection of the first conducting wire with the virtual circle is designated as a point p1, and an intersection of the second conducting wire with the virtual circle is designated as a point p2, and (b) a central angle of an arc between the point p1 and the point p2 on the virtual circle is designated as $\alpha$ degree.

8. The electric power steering apparatus of claim 7, wherein a pair of the first and second conducting wires is made in plural sets.

9. An electric power steering apparatus comprising:

a motor, which includes:

a stator that includes a plurality of winding wires wound thereon;

a rotor rotatably disposed within an inner radius of the stator;

a shaft coaxially disposed to be rotatable with the rotor;

a magnet disposed on one end of the shaft to be rotatable with the rotor and the shaft;

a magnetic sensor disposed in an axial direction of the shaft for detecting a rotation angle of the rotor by sensing the magnetism generated by the magnet;

a control unit for controlling an electric power supplied to each of the plurality of winding wire based on the rotation angle of the rotor detected by the magnetic sensor; and a first conducting wire and a second conducting wire (a) respectively intersecting with a virtual circle that centers around an axis of the shaft and (b) respectively extending in parallel with the axis of the shaft, for connecting the control unit to each of the plurality of winding wires, wherein the electric current flowing in each of the first conducting wire and the second conducting wire has a same magnitude and opposite flow directions with each other at any point of time, and a position of the first conducting wire and a position of the second conducting wire satisfy a relationship $\alpha=0$, when (a) an intersection of the first conducting wire with the virtual circle is designated as a point p1, and an intersection of the second conducting wire with the virtual circle is designated as a point p2, and (b) a central angle of an arc between the point p1 and the point p2 on the virtual circle is designated as $\alpha$ degree.

10. The electric power steering apparatus of claim 9, wherein
a pair of the first and second conducting wires is made in plural sets.

11. An electric power steering apparatus comprising:
a motor, which includes:
a stator that includes a plurality of winding wires wound thereon;
a rotor rotatably disposed within an inner radius of the stator;
a shaft coaxially disposed to be rotatable with the rotor;
a magnet disposed on one end of the shaft to be rotatable with the rotor and the shaft;
a magnetic sensor disposed in an axial direction of the shaft for detecting a rotation angle of the rotor by sensing the magnetism generated by the magnet;
a control unit for controlling an electric power supplied to each of the plurality of winding wire based on the rotation angle of the rotor detected by the magnetic sensor; and a first conducting wire, a second conducting wire and a third conducting wire (a) respectively intersecting with a tangent line of a virtual circle that centers around an axis of the shaft and (b) respectively extending in parallel with the axis of the shaft, for connecting the control unit to each of the plurality of winding wires, the second conducting wire being positioned at a tangent point of the tangent line to interpose between the first and third conducting wires, wherein a sum of the electric currents respectively flowing in the first, second and third conducting wires is equal to zero at any point of time, and positions of the first, second and third conducting wires satisfy a relationship of d1=d2=0, when (a) an intersection of the first conducting wire with the virtual circle is designated as a point p1, and an intersection of the second conducting wire with the virtual circle is designated as a point p2, and an intersection of the third conducting wire with the virtual circle is designated as a point p3, and (b) a distance d1 is defined as an interval between the point p1 and the point p2, and a distance d2 is defined as an interval between the point p2 and the point p3.

12. The electric power steering apparatus of claim 11, wherein
a group of the first to third conducting wires is made in plural sets.

* * * * *